United States Patent [19]

Eklund

[11] Patent Number: 5,010,587
[45] Date of Patent: Apr. 23, 1991

[54] APPARTAUS FOR TRANSMITTING A COHERENT FREQUENCY MODULATED OPTICAL SIGNAL

[75] Inventor: Hans A. Eklund, Nykvarn, Sweden
[73] Assignee: Telefonaktiebolaget L M Ericsson, Stockholm, Sweden
[21] Appl. No.: 321,065
[22] Filed: Mar. 8, 1989
[30] Foreign Application Priority Data Mar. 11, 1988 [SE] Sweden .............................. 8800884

[51] Int. Cl.$^5$ .................................................. H04B 10/04
[52] U.S. Cl. ........................................ 455/618; 372/32
[58] Field of Search ........................ 350/96.13, 96.14; 455/600, 609, 611, 612, 613, 617, 618, 615; 372/32

[56] References Cited

U.S. PATENT DOCUMENTS

| | | | |
|---|---|---|---|
| 4,232,385 | 11/1980 | Hara et al. | 370/3 |
| 4,483,582 | 11/1984 | Sheem | 350/96.15 |
| 4,601,027 | 7/1986 | Scarr et al. | 370/3 |
| 4,677,398 | 6/1987 | Honeycutt et al. | 370/3 |
| 4,798,429 | 1/1989 | Djupsjobacka | 350/96.14 |
| 4,835,782 | 5/1989 | Kaede | 372/32 |
| 4,856,094 | 8/1989 | Heidrich | 455/619 |

FOREIGN PATENT DOCUMENTS

| | | | |
|---|---|---|---|
| 0045050 | 2/1982 | European Pat. Off. | |
| 0131818 | 1/1985 | European Pat. Off. | 370/3 |
| 0142427 | 5/1985 | European Pat. Off. | |
| 0152991 | 8/1985 | European Pat. Off. | |
| 0235919 | 9/1987 | European Pat. Off. | |
| 3010802 | 9/1981 | Fed. Rep. of Germany | |
| 3301620 | 7/1984 | Fed. Rep. of Germany | |
| 3503877 | 8/1985 | Fed. Rep. of Germany | |
| 3628535 | 3/1987 | Fed. Rep. of Germany | |
| 2485837 | 12/1981 | France | |
| 2563672 | 10/1985 | France | |
| 58-63244 | 4/1983 | Japan | |
| 58-117739 | 7/1983 | Japan | |
| 59-60406 | 4/1984 | Japan | |
| 59-208509 | 11/1984 | Japan | |
| 0147437 | 6/1989 | Japan | 455/619 |
| 2131567 | 6/1984 | United Kingdom | |
| 2155719 | 9/1985 | United Kingdom | |
| 2168561 | 6/1986 | United Kingdom | |
| 2170370 | 7/1986 | United Kingdom | |

OTHER PUBLICATIONS

"A Tutorial Review of Techniques for Coherent Optical Fibers Transmission System", Aug. 1985, vol. 23, No. 8, IEEE Communications Magazine, pp. 37–53.
"A 1 Gbit/s Integrated Optical Modulator", Dec. 1979, vol. QE–15, No. 12, *IEEE Journal of Quantum Electronics*, pp. 1415–1418.
"Frequency Stabilization of Semiconductor Lasers", 1980, SPIE vol. 239, Guided Wave Optical and Surface Acoustic Wave Devices Systems and Applications.
"Spectral Linewidth Reduction in Semiconductor Lasers by an External Cavity with Weak Optical Feedback", Oct. 27, 1983, vol. 19, No. 22, Electronics Letters.
"10 kHz Linewidth 1–5 um InGaAsP External Cavity Laser with 55 nm Turning Ranges", Feb. 3, 1983, vol. 19, No. 3, *Electronics Letters*, pp. 110–112.

*Primary Examiner*—Joseph A. Orsino
*Assistant Examiner*—L. Van Beek
*Attorney, Agent, or Firm*—Burns, Doane, Swecker & Mathis

[57] ABSTRACT

A first (1) and a second (6) narrowband laser device (1, 6) are each connected to an optical coupler means (3, 8) and also to each an input (13, 14) of a directional coupler (15). The coupler means (3, 8) have their respective outputs (5, 10) connected to a photo detector (18). The laser devices (1, 6) are each connected to their respective control circuit (17, 20). The control circuit (20) of the second laser device (6) is in turn connected to the output (19) of the photo diode (18) and to an exterior control signal (V2) with a frequency $f_0$. Controlled by its control circuit (17) the first laser device (1) transmits a light signal (S1) with a fixed frequency $f_1$, and the second laser device (6) transmits a light signal (S3) with a frequency $f_2$. The photo detector (18) transmits a signal (V1) with a frequency $f_2-f_1$ and the second control circuit (20) controls the second laser device (6) so that $f_2-f_1=f_0$. An information carrying signal (V3) resets the directional coupler (15) and alternatingly switches the laser devices (1, 6) to the output (16) of the directional coupler (15). From this output there is sent a coherent frequency modulated signal S7 with the frequencies $f_1$ and $f_2$.

4 Claims, 2 Drawing Sheets

APPARTAUS FOR TRANSMITTING A COHERENT FREQUENCY MODULATED OPTICAL SIGNAL

TECHNICAL FIELD

The present invention relates to an apparatus for transmitting a coherent, frequency modulated optical signal, said apparatus including a laser light source, with a spectral bandwidth about each transmitted frequency which is less than 100 MHz, an optical coupler connected to the laser light source and controllable by electrical control means, which can be connected to an information carrying signal.

BACKGROUND ART

Incoherent systems have been used to a large extent in transmitting information through optical fibres. An example of such a system is shown in the French Patent Application No. 2563672. The transmitter in this system has two lasers with different wavelengths, e.g. 0.8 microns and 0.78 microns, corresponding to "zeros" and "ones". The system is simple, but the lasers are wideband and the system only permits transmission of about 10 channels on one and the same optical fibre. To increase the transmitting capacity there have been suggested coherent transmission system, e.g. according to IEEE communications Magazine, Aug. 1985—Vol. 23, No. 8, pp 37–53, I. W. Stanley: "A Tutorial Review of Techniques for Coherent Optical Fiber Transmission Systems". In this article it is proposed that the transmitter has a narrowband laser, a so-called Distributed FeedBack Laser (DFB laser), the light frequency of which shifts between two values by the driving current of the laser being controlled between two values. The light wavelength of the laser is dependent on the temperature, however, which in turn is effected by the drive current. It is therefore difficult to modulate the light frequency of a laser in this way at a high modulation frequency.

A coherent optical transmission system, a so-called Frequency Division Multiplex system (FDM system) is described in the European Patent Application No. 0131818. A Raman-Nath modulator is connected to a highly stable laser and to a first modulating signal. The modulator has a desired number of outputs with different optical frequencies, which deviate from the laser frequency by a multiple of the frequency of the first modulating signal. The light from the Raman-Nath modulator output is modulated in turn by information carrying signals, e.g. television signals, and the modulated light signals are transmitted via an optical fibre to a receiver. Via a further optical fibre, this obtains light from the highly stable laser, and with the aid of this light the information carrying signals can be recreated. The illustrated apparatus has disadvantages, which are, inter alia, that there is crosstalk between the Roman Nath modulator outputs. This modulator is also relatively slow and gives rise to large losses of light energy.

An apparatus for generating a frequency modulated coherent optical signal is shown in The British patent Application No. 2131567. This apparatus has an optoelectronic modulator which is connected to a highly stable laser and an electronic control means. The modulator includes three waveguide branches with substantially the same length, which have a common input and a common output. The three waveguide branches each has a phase shifter, which obtains electrical signals from the control means. The light from the highly stable laser passes the phase shifters and can here be acted on so that light with either of two separate optical frequencies is obtained at the modulator output. The apparatus has the disadvantage that crosstalk is difficult to avoid, so that both the optical frequencies are present simultaneously in the transmitted light. There are also overtones of the modulated frequency in the transmitted light.

DISCLOSURE OF INVENTION

The above-mentioned disadvantages are avoided with an apparatus in accordance with the invention, which can transmit a coherent, frequency modulated optical signal with high modulation frequency, minor crosstalk and overtone content.

The invention has the distinguishing features which are apparent from the accompanying claim.

BRIEF DESCRIPTION OF DRAWINGS

The present invention will now be described in more detail below and with reference to drawings, where.

BEST MODE FOR CARRYING OUT THE EMBODIMENT

Figure 1:
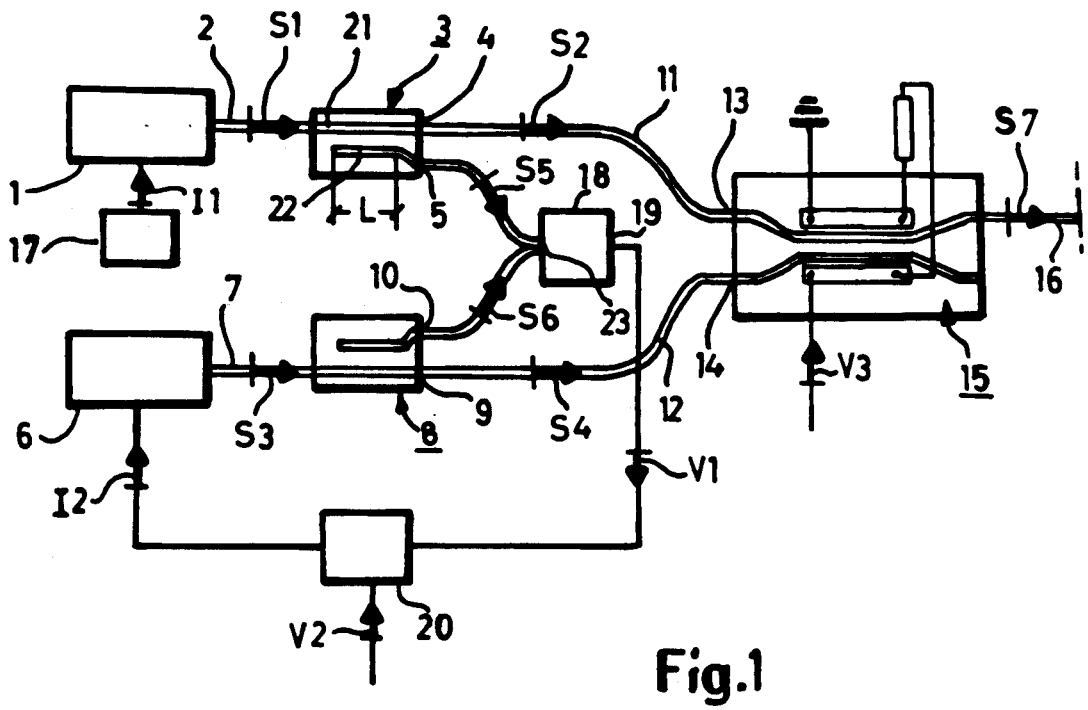
FIG. 1 is a block diagram of the inventive apparatus.

An embodiment of the inventive frequency modulator is illustrated in FIG. 1. A first narrowband laser device 1 is connected via a polarization-maintaining optical fibre 2 to an optical coupler means 3 having two outputs 4 and 5. A second narrowband laser device 6 is connected via a polarization-maintaining fibre 7 to an optical coupler means 8 with outputs 9 and 10. The outputs 4 and 9 of the optical coupler means are connected, with the aid of polarization-maintaining optical fibres 11 and 12, to their respective input 13 and 14 on an optical directional coupler 15, one output of which is connected to an optical fibre 16. The first laser device 1 is connected to a first control circuit 17, which keeps the optical frequency f, of the device at a constant value. The outputs 5 and 10 of the optical coupler means 3 and 8 are connected to an optical input 23 of a photo detector 18, which has an electrical output 19. This output is connected to a second control circuit 20, the output of which is in turn connected to the second laser device 6. As will be described below, the second control circuit 20 keeps the optical frequency $f_2$ of the second laser device 6 at a constant value. The first laser device 1 transmits a lightwave S1, of which a larger part S2 passed the coupler means 3 and reaches the input 13 of the directional coupler 15. The second laser device 6 transmits a lightwave S3, of which a larger part S4 passes the coupler means 8 and reaches the input 14 of the directional coupler 15. The lightwaves S2 and S4 can be alternatingly connected to the outgoing fibre 16 with the aid of the directional coupler 15, such as to constitute a frequency modulated coherent optical signal.

As mentioned above, the laser devices 1 and 6 are narrowband. A simple semiconductor laser sends light with a relatively wide wavelength spectrum, which has a central amplitude maximum and several side maxima. Such a conventional laser can be provided with wave-reflecting surfaces at a distance of half a wavelength from each other along the length of the laser and such a laser is designated "DFB laser", as mentioned above. This laser sends light with wavelengths substantially about the central maximum. The bandwidth of this light can be further reduced by the DFB laser being provided with an exterior cavity. The laser devices 1 and 6 are such DFB lasers, with a cavity and are more exhaustively discribed in the above-mentioned reference in the IEEE communications Magazine 1985 by I. W. Stanley. The laser control circuit 17, which controls the frequency of the first laser device 1 is a constant current source of known embodiment, which keeps the laser drive current I1 at a constant value.

The optical coupler means 3 and 8 each includes a wafer of optoelectronic material, e.g. lithium niobate, with two waveguides 21 and 22 diffused into the surface of the wafer. The waveguides on the wafer are so close to each other along an interaction distance L that the electromagnetic field in one waveguide 21 acts on the other waveguide 22. The lightwave, S1 or S3, in one waveguide is thus partially coupled over to the other waveguide. The coupler means 3 and 8 send respective lightwaves S5 and S6 from the outputs 5 and 10 to the photo detector 18, and the directional coupler parameters are so selected that these lightwaves are relatively weak. The lightwaves S5 and S6 are superposed on each other and are detected by the photo detector 18, which transmits an electrical difference signal V1 with the frequency $f_s = f_2 - f_1$. The signal V1 is connected to the second control circuit 20, which is also connected to an exterior reference signal V2 with a frequency $f_0$. The second control circuit 20, which is a known frequency-to-current converter, sends a drive current I2 to the laser in the laser device 6 and thus controls the frequency $f_2$ of the lightwave S3. The control circuit 20, which senses the difference signal V1, controls the drive current I2 to a value such that $f_s = f_2 - f_1 = f_0$.

The directional coupler 15 is a high-speed modulator, e.g. of the type described in IEEE Journal of Quantum Electronics, Vol. QE-15, No. 12, Dec. 1979, pp 1415–1418, Peter S Cross and Ronald V Schmidt: "A 1 Gbit/s integrated Optical Modulator". The directional coupler drawn in FIG. 1 only schematically shows a high-speed modulator, and is not a depiction of the modulator according to this reference. An information carrying signal V3 is connected to the electrode of the directional coupler. This signal puts the coupler 15 alternatingly in the crossover and straight-through states and alternatingly couples the signals S2 and S4 to the outgoing optical fibre 16. The directional coupler 15 thus transmits a signal S7 which constitutes the desired, coherent, frequency modulated optical signal.

Figure 2:
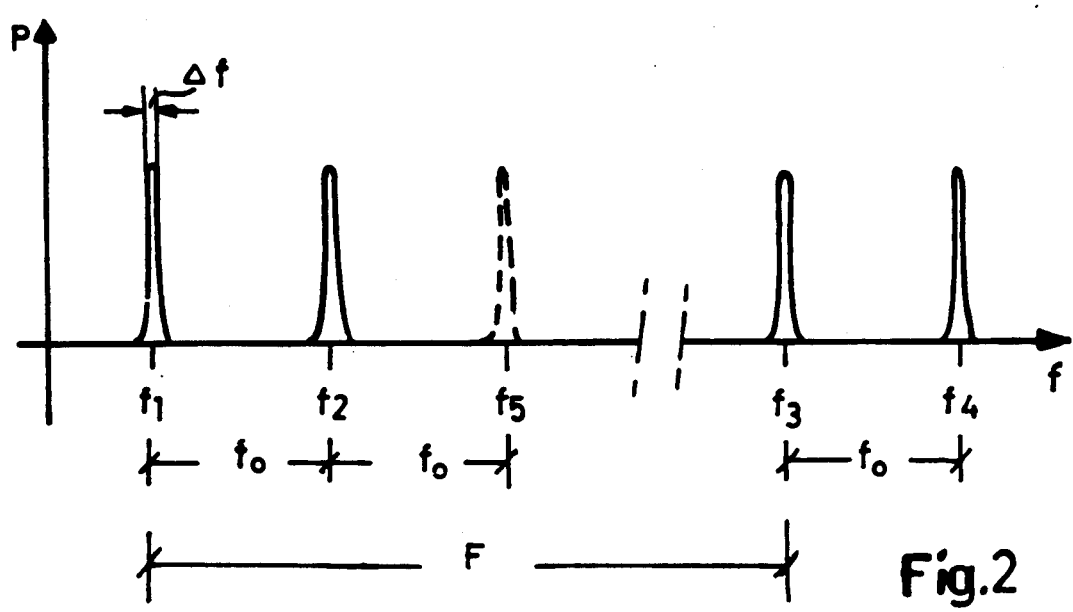
FIG. 2 is a frequency distribution diagram of the transmitted light.

The frequencies of the signals S1 and S2 from the laser devices 1 and 6 are shown in more detail in FIG. 2. In this Figure the optical frequency is denoted by f, and its power level by P. The light frequencies $f_1$ and $f_2$ are of the order of magnitude $10^{14}$ Hz, e.g. approximately $2 \times 10^{14}$ Hz for light with a wavelength of about 1.5 microns. The frequency difference $f_0$ is of the order of magnitude $1 \times 10^9$ Hz (1 GHz) and both laser devices 1 and 6 have a bandwidth of the order of magnitude $\Delta f = 10^6$ Hz. As mentioned in the introduction, it is a desire to be able to transmit a plurality of frequency modulated, coherent optical signals on a single optical fibre. The signal S7 can be transmitted together with an optical signal S, which has been drawn in FIG. 2. The signal S8 has the frequencies $f_3$ and $f_4$, which are generated in the way described in connection with FIG. 1. The frequency difference between $f_3$ and $f_4$ has the value $f_0$ in the example here, as has the frequency difference between $f_1$ and $f_2$. Further frequency modulated signals can be transmitted on the same optical fibre as the signals S7 and S8. The frequency difference between $f_1$ and $f_3$ in the example has a value $F = 2 \times 10^{10}$ Hz. The above-mentioned values for the bandwidth $\Delta f$ and the frequency differences $f_0$ and F are no part of the inventive subject. The values are selected by one skilled in the art so that the frequencies can be reliably separated in a receiver.

Figure 3:
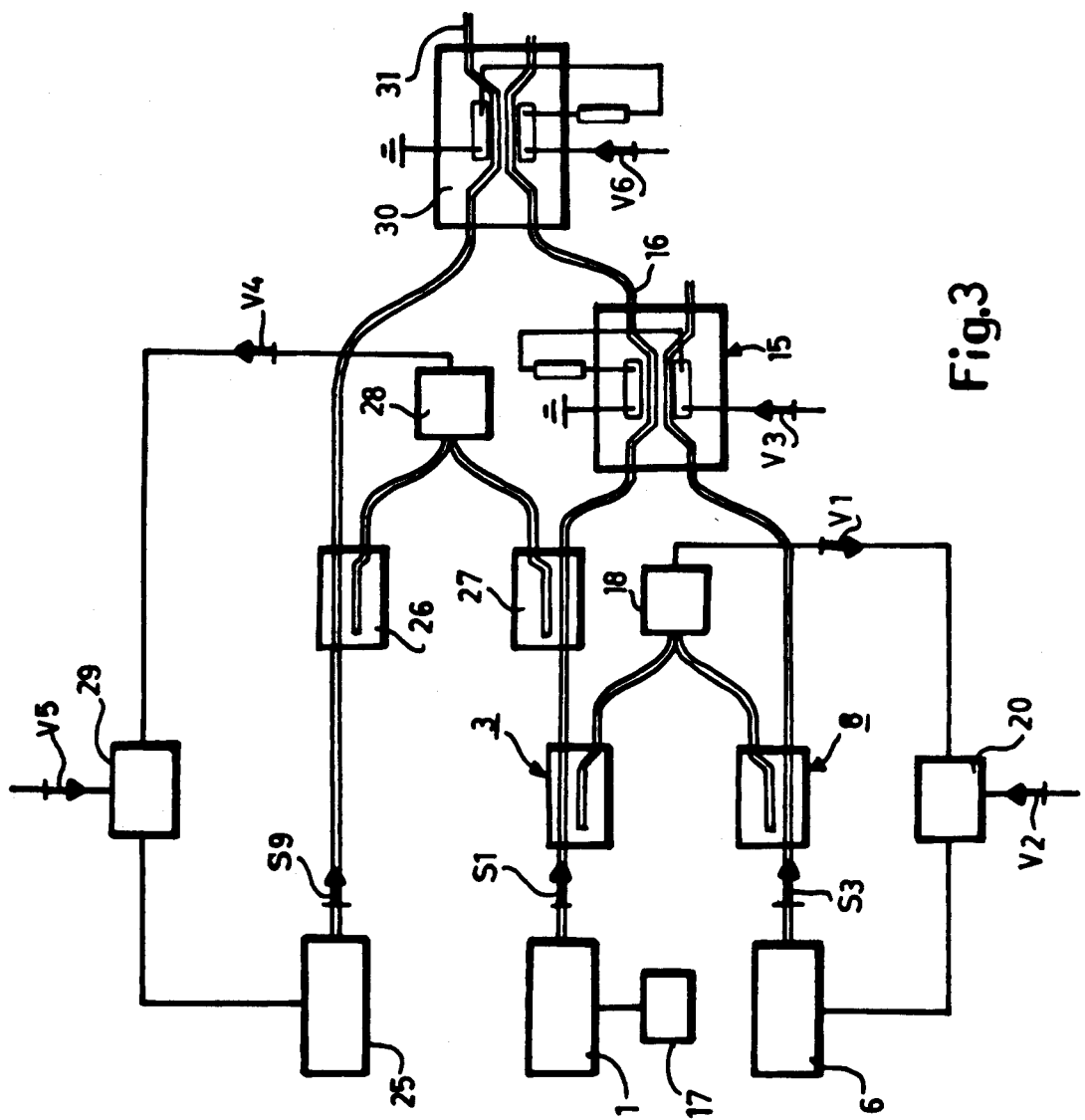
FIG. 3 is a block diagram of a further embodiment of the inventive apparatus.

The inventive apparatus according to FIG. 1 transmits a signal with two frequencies, as described above. The apparatus can be extended to transmit a frequency modulated signal having several frequencies. An apparatus for three frequencies is illustrated schematically in FIG. 3. The apparatus according to FIG. 1 has been provided with a further laser device 25, two coupler means 26 and 27, a photo detector 28, a control circuit 29 and a directional coupler 30, the electrodes of which are connected to an information carrying signal V6. The control circuit 29 obtains a signal V4 from the photo detector and is connected to a control signal V5 in the way described for the control circuit 20. Via a control current, the control circuit 29 controls the laser means 25, which transmits a light signal S9 with a frequency $f_5$ such that $f_5 - f_1 = 2f_0$. This signal has been indicated by dashed lines in FIG. 2. The signals from the laser devices 1, 6 and 25 are switched by the directional coupler 15 and 30 with the aid of signals V3 and V6 to an output optical fibre 31, and in this fibre constitute a coherent, frequency modulated optical signal with the three frequencies $f_1$, $f_2$ and $f_5$.

In the embodiments described above, the laser frequencies $f_1$, $f_2$ and $f_5$ have been controlled with the aid of the drive current. In an alternative embodiment, the frequency-deciding local reference can constitute a gas laser that controls the frequency of a semiconductor laser, as has been described in the above-mentioned article in IEEE Communications Magazine by I. W. Stanley. The frequencies $f_2$ and $f_5$ can be controlled by acting on the temperature of the lasers, e.g. via Peltier elements which are connected to the control circuits 20 and 29. According to the embodiment example above, the optical coupler means 3 and 8 have a wafer of optoelectronic material with waveguides. These coupler means can be implemented in other ways, e.g. they can comprise two juxtaposed optical fibres.

I claim:

1. Apparatus for transmitting a coherent, frequency modulated optical signal, said apparatus comprising:
   a laser light source transmitting at least two frequencies, each frequency having a spectral bandwidth which is less than 100 MHz,
   an optical coupler connected to the laser light source and controllable by an electrical control means wherein the laser light source includes at least two laser devices each with an optical output connected to an optical input of the optical coupler and also to at least one photodetector, each photodetector connected to said optical outputs of two of said laser devices; at least one of the laser devices being connected to a frequency-determining normal control circuit which determines the light frequency of this laser device; each of the other of said at least two laser devices connected to a frequency control circuit which controls the light frequency of the respective laser device, and said at least one photodetector connected to one of the frequency control circuits, said at least one photodetector transmits difference signals corresponding to the difference between frequencies of the laser devices, to the frequency controlling circuits which transmit control signals corresponding to said difference signals and at least one outside reference signal to the other of said at least two laser devices, so that the frequency differences of the laser devices are determined by said at least one outside reference signal; the electrical control means coupling the light alternatingly from the at least two laser devices to an output of the optical coupler such as to constitute the coherent, frequency modulated optical signal.

2. An apparatus for transmitting a coherent, frequency modulated optical signal, said apparatus comprising:

a laser source including at least two laser devices, each laser device having an optical output and each laser device providing laser light of a distinct frequency;

photodetector means, coupled to said outputs of two of said at least two laser devices, for detecting the output of said at least two laser devices and for outputting difference signals corresponding to frequency differences between said at least two laser devices;

frequency-determining normal control means, connected to one of said at least two laser devices, for determining the light frequency produced by said connected laser device;

frequency control means, connected to the other of said at least two laser devices, for determining the light frequency produced by the other of said at least two laser devices in accordance with said difference signals output by said photodetector means and at least one outside reference signal so that the frequency differences of said at least two laser devices corresponds to said outside reference signal;

an optical coupler, having at least two optical inputs and at least one optical output, each of said optical inputs connected to a corresponding optical output of one of said laser devices, for selectively coupling the laser light of at least one of said laser devices to said optical output of said optical coupler; and electrical control means for controlling said optical coupler by alternatingly coupling the output of said at least two laser devices to said optical coupler output thereby modulating the frequency of an output signal output by said optical coupler, the output signal being a coherent optical signal.

3. An apparatus for transmitting a coherent, frequency modulated signal, said apparatus comprising:

first light source means for outputting coherent light of a first frequency;

second light source means for outputting coherent light of a second frequency;

first photodetector means for detecting a difference between said first frequency and said second frequency, and for outputting a first difference signal;

first frequency-determining control means, connected to said first light source means, for determining said first frequency;

second frequency-determining control means, connected to said second light source means, for determining said second frequency in accordance with said first difference signal output by said first photodetector means and a first outside reference signal so that the frequency difference between said first frequency and said second frequency corresponds to said first outside reference signal;

a first optical coupler, including two optical inputs for receiving coherent light from said first and second light source means, for selectively coupling said coherent light to an optical output of said first optical coupler; and first electrical control means for controlling said first optical coupler so that said optical coupler selectively outputs an output signal including coherent light from either said first light source means or said second light source means, thereby frequency modulating said output signal.

4. An apparatus according to claim 3, further comprising:

third light source means for outputting coherent light of a third frequency;

second photodetector means for detecting a difference between said third frequency and said first frequency, and for outputting a second difference signal;

third frequency-determining control means connected to said third light source means, for determining said third frequency in accordance with said second difference signal output by said second photodetector means and a second outside reference signal so that the difference between said third frequency and said first frequency corresponds to said second outside reference signal;

a second optical coupler, including two optical inputs for receiving coherent light from said third light source means and said first optical coupler, for selectively coupling said coherent light to an optical output of said second optical coupler; and second electrical control means for controlling said second optical coupler so that said optical coupler selectively outputs an output signal including coherent light from either said third light source means or said first optical coupler, thereby further frequency modulating said output signal.

* * * * *